United States Patent
Koch et al.

(10) Patent No.: US 8,920,756 B2
(45) Date of Patent: *Dec. 30, 2014

(54) SILVER PROMOTED CLOSE-COUPLED NOX ABSORBER

(71) Applicant: GM Global Technology Operations LLC, Detroit, MI (US)

(72) Inventors: Calvin K. Koch, Bloomfield Hills, MI (US); Gongshin Qi, Troy, MI (US); Steven J. Schmieg, Troy, MI (US); Wei Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 27 days.

This patent is subject to a terminal disclaimer.

(21) Appl. No.: 13/664,749

(22) Filed: Oct. 31, 2012

(65) Prior Publication Data

US 2013/0294990 A1     Nov. 7, 2013

Related U.S. Application Data

(60) Provisional application No. 61/643,472, filed on May 7, 2012, provisional application No. 61/644,510, filed on May 9, 2012.

(51) Int. Cl.
     *B01D 53/56*     (2006.01)
(52) U.S. Cl.
     USPC ........................................ 423/213.2; 423/212
(58) Field of Classification Search
     USPC ............................................. 423/212, 213.2
     See application file for complete search history.

(56) References Cited

U.S. PATENT DOCUMENTS

| | | | | |
|---|---|---|---|---|
| 5,559,072 | A * | 9/1996 | Itoh et al. | 502/347 |
| 2008/0066456 | A1 | 3/2008 | Schmieg et al. | |
| 2009/0269263 | A1* | 10/2009 | Rohart et al. | 423/213.2 |
| 2010/0050604 | A1* | 3/2010 | Hoard et al. | 60/286 |
| 2011/0011068 | A1* | 1/2011 | Ren et al. | 60/297 |
| 2012/0079813 | A1 | 4/2012 | Sloan et al. | |

FOREIGN PATENT DOCUMENTS

EP     1541219 A1 *    6/2005

OTHER PUBLICATIONS

Julian Edgar, "Common Rail Diesel Engine Management, Part 1", Autospeed, Issue 414, Jan. 20, 2007.*
S. Chauhan, "Noble metal catalysts for monolithic converters", J. Chem. Pharm. Res., 2010, 2(4):602-611.*

* cited by examiner

*Primary Examiner* — Ngoc-Yen Nguyen
*Assistant Examiner* — Anita Nassiri Motlagh
(74) *Attorney, Agent, or Firm* — Reising Ethington P.C.

(57) ABSTRACT

$Ag/Al_2O_3$ materials may be packaged in a suitable flow-through reactor, in combination with another material selected as a passive NOx adsorber material (PNA), both the silver material and the adsorber material being close coupled to the exhaust manifold of a diesel engine, and upstream of other catalytic devices, such as a diesel oxidation catalyst and a selective reduction catalyst for NOx. The silver catalyst material uses hydrogen in a cold-start engine exhaust and serves to oxidize NO to $NO_2$ in the relatively low temperature, hydrocarbon-containing, exhaust during a short period following the engine cold start, and to temporarily store NOx during the start-up period. After the flowing exhaust gas stream has heated the PNA and the downstream catalytic devices, the silver yields its nitrogen oxides for conversion to nitrogen by the then-operating devices before NOx is discharged to the atmosphere.

20 Claims, 2 Drawing Sheets

SILVER PROMOTED CLOSE-COUPLED NOX ABSORBER

This application claims priority based on provisional application 61/644,510, titled Silver Promoted Close-Coupled NOx Absorber, filed May 9, 2012 and which is incorporated herein by reference. This application also claims priority based on provisional application 61/643,472, titled "Nitric Oxide Oxidation over Silver Based Catalysts," filed May 7, 2012 and which is incorporated herein by reference.

TECHNICAL FIELD

This disclosure pertains to improvement in temporary storage of nitrogen oxides (NOx) absorbed from the exhaust from a diesel engine during the first few minutes following a cold-start of the engine. More specifically this disclosure pertains to the use of particulate silver/alumina materials (Ag or silver oxide particles supported on $Al_2O_3$ particles) to absorb NOx from relatively low temperature diesel engine exhaust gas which also contains relatively small amounts of hydrogen and incompletely burned hydrocarbons. The silver material is preferably used in combination with another material that oxidizes NO and/or absorbs NOx, especially when the exhaust gas stream has heated the silver/alumina material above its effective operating temperature.

BACKGROUND OF THE INVENTION

Over the past several decades automotive vehicle manufacturers have satisfied continually-decreasing limits on the amounts of carbon monoxide, unburned hydrocarbons, and nitrogen oxides (collectively, NOx) that are discharged to the atmosphere in the exhaust from vehicle engines. These requirements of reduced exhaust emissions are combined with requirements for increased fuel economy. These combined requirements have required ever more sophisticated engines, computer control of engines, and exhaust gas treatment systems, including catalytic reactors, in the exhaust stream.

Present exhaust treatment systems are quite effective in treating the exhaust from a warmed-up engine because the catalyst materials have been heated to temperatures (e.g., 250° C. and above) at which they serve to effectively oxidize carbon monoxide and incompletely burned fuel constituents, and to reduce nitrogen oxides. These treatment systems have been quite effective for both gasoline-fueled engines operating at a stoichiometric air to fuel ratio and diesel engines (and other lean-burn engines) which operate with considerable excess air (sometimes called "lean burn"). It has been difficult to treat exhaust emissions immediately following a cold engine start, before the exhaust gas has heated the catalytic reactor or other processing containers to the effective temperatures of the catalyst or other functioning materials. It is realized that such untreated emissions will make-up a significant portion of the total emissions in the mandated testing of engine exhaust systems. The problem is particularly difficult with the treatment of mixed nitrogen oxides in the exhaust of diesel engines. These nitrogen oxides comprise nitric oxide (NO), nitrogen dioxide ($NO_2$) and, generally, smaller amounts of other nitrogen oxides, the mixture typically referred to as NOx. There is, therefore, a need for better systems for treating the exhaust gas from an engine following a cold start. The need is particularly acute in lean-burn engines, such as diesel engines, which tend to produce cooler exhaust streams because of the excess air used in the combustion mixtures charged to their cylinders.

SUMMARY OF THE INVENTION

This disclosure provides and illustrates practices for the absorption of NOx from the exhaust gas pumped from the exhaust manifold of a diesel engine in the brief period following a cold-start of the engine. But practices of the invention are also applicable in the cold starting period of lean-burn gasoline engines and other hydrocarbon fuel burning internal combustion engines (whether compression ignited or spark ignited) which are operated such that they produce a combination of nitric oxide and hydrogen as part of their exhaust gas stream, particularly following a start-up of the engine when it is at an ambient temperature (sometimes called a cold-start) or at a temperature below its warmed up operating temperature and its exhaust gas has not heated the exhaust gas treatment systems of the vehicle to their operating temperatures.

Silver-based materials comprising nanometer-size particles of silver (or of a silver oxide, for example, $Ag_2O$) deposited on particles of high surface area alumina (Ag/$Al_2O_3$) are found to oxidize nitric oxide to nitrogen dioxide and to absorb nitrogen dioxide from a flowing stream of diesel exhaust gas at relatively low temperatures, for example from about 75° C. to about 250° C. In general, the silver/alumina material contains about one-half percent to about ten percent by weight silver based on the total weight of the silver/alumina material. This silver-based absorbent material thus oxidizes NO and absorbs NOx from exhaust gas containing a few hundred parts per million of hydrogen in addition to other nitrogen oxides, carbon monoxide, carbon dioxide, unburned hydrocarbons, oxygen, water, and nitrogen. At such relatively low exhaust temperatures, and with the presence of about 100 ppm to about 1000 ppm, or more, of hydrogen, the silver/alumina material serves to oxidize NO and absorb $NO_2$ even in the presence of some lower molecular weight hydrocarbons. Indeed the silver/alumina material serves better than platinum group metals for this purpose and under these cold start conditions.

In preferred embodiments of the invention the particulate silver/alumina material is used in combination with NOx adsorbers, close-coupled to the exhaust manifold of the engine, including those that are presently considered for use in systems for trapping and reducing oxides of nitrogen produced during typical lean diesel engine operation. It is preferred that the silver/alumina material be located within about five to about fifty centimeters from the exhaust manifold of the engine or from a turbocharger placed at the exhaust manifold to re-circulate a portion of the exhaust gas stream to the engine. The silver/alumina material assists and complements the storage capability of such close-coupled NOx adsorbers by providing them with $NO_2$ for storage (rather than just NO) because the NOx adsorbers can store $NO_2$ at low temperatures but they can't produce it from NO in hydrocarbon-containing exhaust streams at temperatures below about 200° C.

In one system, the silver/alumina material is used in combination with a close-coupled passive NOx adsorber material which is composed to adsorb and release NOx at relatively low temperatures. An example of the composition of such a passive NOx adsorber material (PNA) is a platinum group metal or mixture of them (PGM). For example, mixtures of platinum and palladium particles supported on ceria or ceria/alumina mixtures may be used. Oxides of other metals are also used as non-PGM PNA materials; for example, ceria-based oxides, such as magnesium-ceria mixed oxides and the like. Such material is considered to be a "passive" adsorber because it does not require an active regeneration activity, such as the production of a momentary "rich" exhaust stream. In this system, the silver/alumina material assists and complements the passive adsorber material by oxidizing NO and storing $NO_2$ in the relatively low temperature, hydrogen-containing exhaust. The $NO_2$ produced by the silver/alumina is also stored by the PNA until the exhaust gas stream is hot enough to remove stored $NO_2$. After the exhaust gas stream has flowed through the silver/alumina material and the passive NOx adsorber, it is typically subjected to a reduction process for reducing the NOx to nitrogen. One widely used NOx reduction process involves the injection of an aqueous urea solution into the exhaust stream (to form ammonia as a reductant) at an under-floor location in the exhaust gas flow path, and then passing the ammonia-containing exhaust stream over a catalyst material selected to promote the ammonia-NOx reduction system. This practice is known as ammonia-selective catalytic reduction ($NH_3$-SCR). Thus, one practice for the use of the subject silver/alumina material is in combination with a PNA material followed by a suitable SCR process. In this system the silver/alumina material serves its oxidation and storage functions during the first few minutes following a cold engine start. Thereafter, warmed up exhaust passes through the material as it remains available for the next engine cold-start. But on each cold start cycle the combined effect of the silver/alumina material and the PNA results in greater $NO_2$ storage than either material acting alone.

In another exhaust treatment practice, the silver/alumina material is used in combination with a second type of NOx treatment system, known as a trapping system. These NOx trapping systems are often referred to as lean NOx traps or LNT. LNT systems typically comprise three component materials; an oxidation catalyst for oxidation of NO to $NO_2$, an adsorbent material for adsorbing NOx, and a reduction catalyst for reduction of NO and $NO_2$ to nitrogen. Platinum group element materials (PGM) supported on particles of alumina are often used as the oxidation catalyst portion of a LNT system to oxidize NO to $NO_2$, but the conversion is low until the catalyst temperature is above 200° C. The adsorbent material of an LNT system is typically an oxide of one or more metals such as barium, calcium, strontium, manganese, cerium, magnesium, potassium, sodium, lithium, cesium, lanthanum, or yttrium. Palladium or rhodium is often used as the reduction catalyst. Typically, the operation of the LNT system requires periodic brief periods of engine fuel-rich operation, during which stored $NO_2$ (or NOx) is released from its temporary storage and reduced to nitrogen. But in accordance with practices of this invention, a suitable quantity of a silver/alumina material is used to assist and complement the function of the LNT materials, especially during periods of a few minutes following a cold-start of a diesel engine. The silver/alumina particles serve to oxidize NO to $NO_2$ at exhaust temperatures up to about 200° C. or so, and to absorb the $NO_2$, possibly as silver nitrate or aluminum nitrate compounds. The LNT material also stores $NO_2$ produced on the silver/alumina material to increase the total $NO_2$ storage of the combination of the silver/alumina and the LNT. The silver/alumina material then releases the NOx materials as the warming engine exhaust continues to heat the material above its oxidizing and absorbing temperature range. So an advantage of the combination of silver/alumina and LNT catalyst materials is to provide a broader temperature window to effectively store and release NOx during the typical LNT operation.

In one embodiment of the invention, the silver/alumina catalyst/absorbent is deposited as a wash coat on the walls of an extruded cordierite monolith body having many parallel flow-through channels extending from an inlet face to an outlet face of the body. The monolithic body is typically round or elliptical in cross-section and has, for example, 400 channels per square inch of inlet face surface area, each with a square or hexagonal cross-section and corresponding walls extending the length of the body. The monolithic body may be contained in a suitable high temperature and oxidation-resistant container, with an exhaust inlet and downstream outlet, and positioned close-coupled to the exhaust manifold of the engine. The amount of such silver-containing material is determined for providing for the oxidation of NO and the temporary storage of $NO_2$ (NOx) based on the exhaust flow and warm-up time for the piston stroke displacement of the diesel engine from which the exhaust flows. A representative space velocity for the flow through the wash-coated channels of the monolith may be about 50,000 $h^{-1}$. In other embodiments of the invention the silver/alumina particles may be supported on suitable metallic substrates and other wall-flow substrates.

The silver/alumina particles may be located in a flow-through monolith or other structure in different ways to complement other adsorbent material, whether PNA material or LNT material. The silver/alumina particles may be located upstream in the exhaust gas flow with respect to other adsorbent material or the silver/alumina particles may be applied in a combination with PNA or LNT material. In general, however, the silver material is to be located so that the exhaust stream with its hydrogen content encounters the silver material before it encounters PGM material. For example, other PNA material (which may include, or exclude, platinum group material) may be applied as a first wash coat layer on channel walls of a cordierite extrusion, and the silver/alumina wash coat applied as a second layer, coextensive with and covering the conventional PNA layer. Thus, the silver/alumina absorbent material may be used in different placements and arrangements to complement other PNA material or LNT material in the temporary storage of NOx for subsequent further oxidation of NO and/or subsequent reduction of the NOx as downstream exhaust treatment reactors are heated to their useful operating temperatures.

Other objects and advantages of the invention will be apparent from descriptions of illustrative embodiments which follow in this specification.

DESCRIPTION OF PREFERRED EMBODIMENTS

Figure 1:
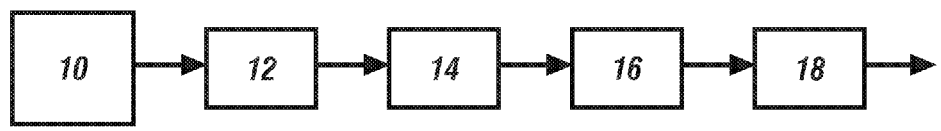
FIG. 1 is a first schematic flow diagram using numbered blocks representing an arrangement of diesel exhaust gas treatment elements. Exhaust gas flowing from the exhaust manifold of the engine (Block 10) first enters an extruded flow-through cordierite body (Block 12), closely coupled to the exhaust manifold and coated with separate wash coats of $Ag/Al_2O_3$+passive NOx adsorber+a diesel oxidation catalyst (DOC). A reductant material may be added to the exhaust gas (Block 14) and the exhaust gas then flows through an SCR reactor (Block 16) downstream in exhaust flow and located under the vehicle body. The exhaust stream then flows through an underbody diesel particulate trap (Block 18) before exiting the tailpipe of the vehicle.

Exhaust emissions from a vehicle engine operated on a dynamometer are often evaluated by operating the engine in accordance with a specified testing procedure in which the engine may be subjected to a cold-start and thereafter accelerated and decelerated as prescribed. One such procedure is the U.S. Federal Test Procedure 75 Cycle. When a representative light-duty diesel engine is operated in accordance with the FTP 75 Cycle it is found that more than 50% of the tailpipe emissions of NOx are emitted during the first two test cycles following a cold start. It is an object of this invention to provide a method and silver/alumina absorbent/catalyst system for use in reducing NOx tailpipe emissions during such engine operating periods.

During warmed-up operation such diesel engines typically produce a hot gaseous exhaust with relatively high contents of oxygen, water, and nitrogen oxides ($NO_x$). In the case of diesel engines, the temperature of the exhaust gas is typically in the range of 50-150 degrees Celsius from a cold engine and 200-400 degrees Celsius from a warmed-up engine (depending, for example, on engine load), and has a representative composition, by volume, of about 10% oxygen, 6% carbon dioxide, 5% water, 0.1% carbon monoxide, 180 ppm hydrocarbons, 235 ppm $NO_x$ and the balance substantially nitrogen. The exhaust gas often contains some very small carbon-rich particles. And to the extent that the hydrocarbon fuel contains sulfur, the exhaust from the combustion source may also contain sulfur dioxide. It is desired to treat such exhaust gas compositions to minimize the discharge of any substance to the atmosphere other than nitrogen, carbon dioxide, and water. A representative value of the flow rate of such a vehicular exhaust stream, with respect to the effective volume of exhaust treatment devices, is, for example, 50,000 $h^{-1}$.

The $NO_x$ gases, typically comprising varying mixtures of nitrogen oxide (NO) and nitrogen dioxide ($NO_2$), are difficult to reduce to nitrogen ($N_2$) because of the high oxygen ($O_2$) content in the hot exhaust stream. It is found that when much of the NO is oxidized to $NO_2$, there are selective catalytic reduction compositions and flow-through catalytic reactor designs for reducing much of the NO and $NO_2$ in the hot exhaust to nitrogen before the exhaust is discharged from the exhaust system. So, in many exhaust treatment systems for lean burn engines a suitable flow-through oxidation catalyst body is located suitably close to the engine exhaust manifold to promote the effective and timely oxidation of NO and CO and HC in the exhaust. A second catalyst material is located downstream from the oxidation catalyst reactor in the flowing exhaust gas stream for the reduction of much of the NO and $NO_2$ to nitrogen and water. Sometimes a reductant material is added to the exhaust gas to enable the selective reduction reaction, and other times the engine may be repeatedly, but very briefly, operated in a fuel-rich mode to supply small amounts of unburned fuel as a reductant for the nitrogen oxides.

In other practices for the treatment of diesel exhaust, an LNT system, as described above, is used to adsorb NOx during fuel-lean operation of the engine and to release and reduce NOx during brief fuel-rich periods of engine operation.

On cold engine start-up, these oxidation and reduction catalyst materials, and LNT system materials must often be heated from an ambient temperature to their respective operating temperatures by the exhaust stream. It is necessary to convert most of the carbon monoxide and unburned hydrocarbons in the exhaust to carbon dioxide and water and to convert most of the NOx to nitrogen and water during all stages of engine operation, including the period when the exhaust system is being heated.

Practices of this invention make use of the inventors' discovery that hydrogen, in amounts of about 100 ppm to 1000 ppm or more, may be present in the exhaust of the diesel engine following engine cold-start. The engine is typically operated under a computerized engine control system for management of timing and amount of fuel injection and air flow, and, during periods following a cold start, hydrogen may be caused to be present in the exhaust of the diesel engine during this stage of vehicle operation. The silver/alumina material employed in practices of this invention uses the presence of suitable (but relatively small) amounts of hydrogen in combination with the silver catalyst and storage material, closely located to the exhaust manifold of the engine, to promote some oxidation of NO to $NO_2$, at exhaust temperatures in the range of 75° C. to about 250° C., and to temporarily assist and complement PNA material or LNT material in storing some of the mixture of NO and $NO_2$ until the exhaust gas heats the silver material above its best operating temperature, and other downstream exhaust treatment reactors take over the exhaust treatment functions. The silver/alumina material helps to convert NO to $NO_2$ which can be stored on PGM and non-PGM NOx adsorbers at temperatures below 200° C. Without silver/alumina, a NOx adsorber material cannot store NO (unless it has a very high PGM content), and it does not efficiently convert NO to $NO_2$ below 200° C. in a hydrocarbon containing feed.

FIG. 1 is a schematic flow diagram of a diesel exhaust system also useful in removing particulate matter from the exhaust. The relatively cold exhaust gas pumped by piston action from the exhaust manifold of an engine such as a diesel engine is indicated at block 10 in FIG. 1. Closely coupled, with a short section of exhaust conduit (e.g., no more than about five centimeters to about fifty centimeters in length), to the exhaust manifold of a diesel vehicle engine is a flow through reactor (block 12), such as an extruded cordierite reactor as described above in this specification. In practices of this invention, the walls of the channels of this reactor vessel (or vessels) are wash-coated with a 5% by weight silver on activated alumina material, a conventional passive NOx adsorber material, and a conventional DOC material. If the NOx adsorber material is a non-platinum group metal material, such as MnCeOx, a DOC will be necessary for further oxidation of exhaust stream constituents. If the NOx adsorber is a platinum group material, it may also serve as the DOC. The function of this first-stage reactor is to promote oxidation of NO to $NO_2$ and temporary storage of $NO_2$ and other NOx constituents. The warmed-up DOC material also serves in the oxidation of carbon monoxide to carbon dioxide and in the oxidation of unburned hydrocarbons to carbon dioxide and water.

In the exhaust gas flow treatment system of this FIG. 1, additional downstream reactors include (i) means for injection of a reductant for NOx, such as an aqueous urea solution into the exhaust stream (block 14) for an ammonia-selective catalytic reduction of NOx (SCR), (ii), an under-the-vehicle floor ammonia SCR reactor (block 16) for the chemical reduction of NOx to $N_2$, and (iii) an under floor device for trapping and removing diesel particulate matter (PM, block 18)) from the exhaust before the exhaust is discharged from the tailpipe into the atmosphere. An under floor DOC (not illustrated in FIG. 1) is typically placed just upstream of the PM unit to periodically burn raw fuel injected into the exhaust at the DOC so as to heat the exhaust for removal of particulate carbon from the PM. These downstream exhaust treatment reactors are of conventional design. But the close-coupled reactor utilizes the silver/alumina material of this invention and requires further discussion.

In an exhaust gas stream treatment sequence depicted by FIG. 1, the close-coupled oxidizing and storage, flow-through reactor (indicated by block 12) may be coated with active materials in different ways. This oxidizing and storage reactor will comprise a suitable arrangement of a subject silver/alumina material, a conventional passive NOx adsorber material (PNA) material, and a diesel oxidation catalyst material (DOC). The DOC material is particularly necessary for oxidation of HC and CO when the PNA material is a non-PGM composition. If the PNA is a PGM composition, it may also serve as the DOC.

Figure 2:
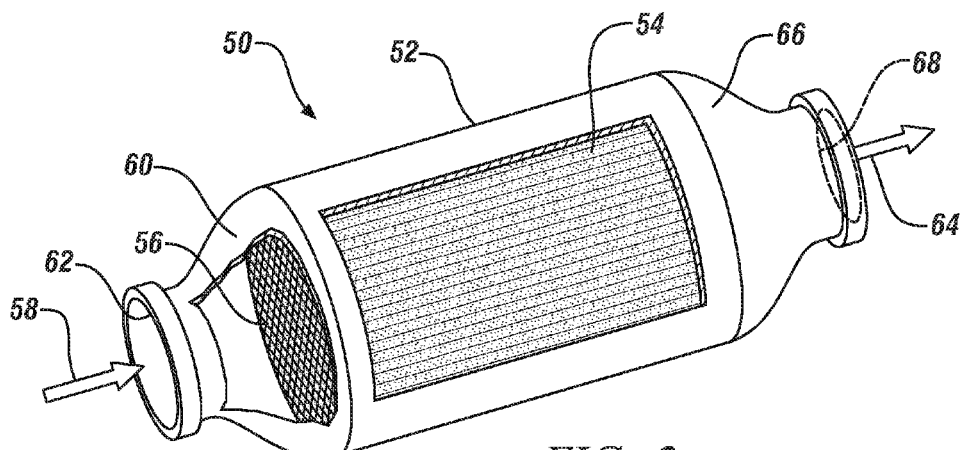
FIG. 2 is an oblique side view of a cylindrical flow-through stainless steel container enclosing an extruded cylindrical cordierite body with many parallel channels, each channel having a square cross-section and extending from a flat exhaust gas flow inlet face of the body to a flat exhaust gas flow outlet face of the body. The four walls of each channel are coated with a thin wash coat layer of a silver/alumina catalyst and other materials for use in accordance with this disclosure. In this illustration the container and cordierite body are each formed as round cylinders, and a portion of the round container wall is broken away to reveal the cordierite body. And the outer wall of the cordierite body is broken away and solid lines illustrate the outer channels.

An illustration of a suitable catalytic reactor 50 for containing a silver/alumina catalyst, a PNA material, and a DOC catalyst in the exhaust stream of a diesel engine is presented in FIG. 2. The reactor 50 may comprise a round tubular stainless steel body 52 for tightly enclosing an extruded, round cylindrical, honey-comb shaped cordierite catalyst support body 54 which is seen in two broken out windows in the side of body 52. Catalyst support body 54 may be formed of other known and suitable high temperature resistant metal or ceramic material. In this embodiment, cordierite catalyst support body 54 is formed with many exhaust gas flow-through channels that extend from an upstream exhaust gas inlet face 56 of the support body 54 through the length of the body to a downstream exhaust gas outlet face (not visible in FIG. 2) of the body 54. For example, 400 flow-through channels per square inch of inlet face are typically formed during extrusion of the ceramic body. The walls of these small flow-through channels are represented as crossing lines in the illustration of the exhaust gas flow inlet face 56. A silver-on-alumina particle catalyst, a PNA material, and a DOC catalyst, each in the form of a particulate wash coat are coated on the walls of each of the channels of the extruded ceramic support body 54 in practices disclosed below in the specification. The diameter of steel body 52 and enclosed catalyst support body 54 is enlarged with respect to the upstream and downstream exhaust conduits so as to reduce drag on the exhaust stream as it engages the inlet face 56 of the silver catalyst support body and flows through the wash coated channels. Support body 54 is sealed within steel body 52 so that exhaust gas flow is directed into contact with the wash coat materials on the channel wall surfaces of support body 54. The catalyst support body is sized with sufficient channel wall surface area to carry sufficient amounts of the three wash coat materials to provide sufficient catalyst contact with a flowing exhaust gas during its residence time in the reactor 50.

As seen in FIG. 2, the upstream end of steel enclosure body 52 (as indicated by exhaust flow direction arrow 58 is enclosed by an expanding stainless steel exhaust inlet section 60. Exhaust inlet 62 of exhaust inlet section 60 is sized and adapted to receive exhaust flow from an exhaust conduit (not shown in FIG. 2) close-coupled to the exhaust manifold of a diesel engine or other lean burn engine. In a like manner, the downstream end (exhaust flow arrow 64) of the steel enclosure body 52 is enclosed by a converging exhaust outlet section 66 with an exhaust gas outlet 68. Outlet 68 is adapted to be welded or otherwise connected to an exhaust conduit to conduct the exhaust gas to a further downstream treatment reactor such as a DOC reactor or an SCR reactor.

Figure 3:
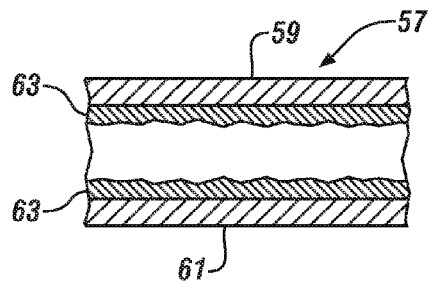
FIG. 3 is a broken out side view of the top and bottom walls of a single channel of the cordierite body illustrated in FIG. 2. The top and bottom wall fragments have been coated with a single wash coat layer of a functional exhaust gas treatment material which may be varied in accordance with this specification.

FIG. 3 illustrates a broken-out section of a portion of the length of a single channel 57, which is one of the many open parallel channels for exhaust gas flow that extends from the inlet end 56 of cordierite body 54 to the outlet (not visible in FIG. 2) of the body 54. But exhaust gas flow is accommodated through the full length of each of the many channels. In the cross section of FIG. 3, a portion of the length of the top wall 59 and a portion of the length of the bottom wall 61 of channel 57 are seen. These thin walls 59 and 61 are formed of extruded and calcined cordierite composition. And each wall typically has an opposite surface which serves as a wall surface for another channel in the body 54. Present on the top wall 59 and the bottom wall 61 of channel 57 is a layer wash coat material for performing a treatment function on exhaust gas flowing through the channel. Although not illustrated in FIG. 3, when channel 57 is an inner channel, the outer surfaces of walls 59 and 61 are also coated with wash coat material layers. Each type of wash coat material described in this specification is formed as an aqueous slurry deposited on the walls of the channels of body 54, and then dried and calcined in place to form a thin adherent coating on each of the four walls of the channels.

In a first embodiment, the Ag/Al$_2$O$_3$ material, a non-PGM, PNA material, and a DOC material may be deposited as separate wash-coats, in progressive downstream order, on the channel walls of a single extruded cordierite body 54 (sometimes called a "brick") as illustrated in FIG. 2. In other words, the silver/alumina material is applied as layer 63 on channel walls closest to the inlet 56 of the body, the PNA material is coated as a layer like layer 63 on channel walls in the middle section of the body, and the DOC material is coated as a layer like layer 63 near the outlet of the cordierite brick. In other arrangements, the three coatings may be distributed as single layers over two or three bricks.

Figure 4:
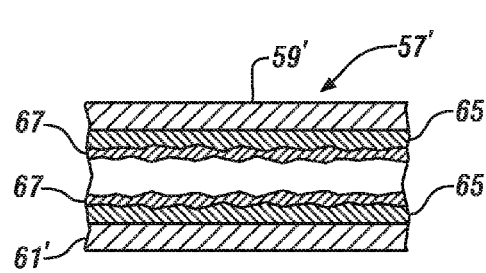
FIG. 4 is a broken out side view of the top and bottom walls of a single channel of the cordierite body illustrated in FIG. 2. The top and bottom wall fragments have been coated with two overlying and co-extensive wash coat layers of functional exhaust gas treatment materials which may be varied in accordance with this specification.

Other arrangements of the wash-coated materials may be employed in distributing them as wash coats on the channel walls of a single brick or cordierite body. When the PNA material does not comprise platinum group materials, the three materials may be applied as two layers or as a single layer on the walls of a single body. FIG. 4 is a schematic illustration of a portion of a channel 57' with top wall 59' and bottom wall 61' each carrying a first applied wash coat layer 65 bonded to the wall surfaces and a later applied wash coat layer 67 adhering to the first wash coat layer 65. In a two-layer arrangement, the DOC material may be applied as a first wash coat material coextensively with the walls of the brick, and a mixture of the Ag/Al$_2$O$_3$ material and the PNA material applied as a second wash coat layer over the DOC layer. In another arrangement, a mixture of the three materials is applied as a single layer on the channel walls of the cordierite body. In each of these arrangements, the Ag/Al$_2$O$_3$ material complements the function of the PNA material, during the period of a few minutes following a cold engine start, in affecting the oxidation of NO to NO$_2$ and the temporary storage of the NO$_2$ in a low temperature, hydrogen-containing diesel exhaust. Again, in most of the channels of a cordierite body like wash coating layers would be formed on both sides of each channel wall.

Figure 5:
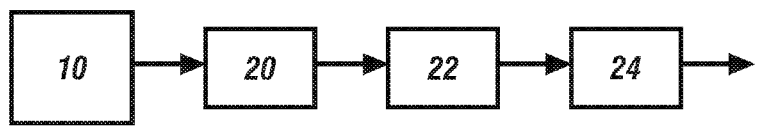
FIG. 5 is a second schematic flow diagram using numbered blocks to illustrate a second arrangement of diesel exhaust gas treatment elements. Exhaust gas flowing from the exhaust manifold of the engine (Block 10) first enters a close-coupled, extruded flow-through cordierite body coated with $Ag/Al_2O_3$ plus the component materials of an LNT (Block 20). The treated exhaust gas then optionally flows through a DOC reactor (Block 22) and a diesel particulate trap (Block 24) before exiting the tailpipe.

FIG. 5 is a block flow diagram illustrating the use of Ag/Al$_2$O$_3$ material in a different arrangement of diesel exhaust treatment components. Exhaust gas exiting the exhaust manifold of an engine following a cold start (block 10) enters a reactor (block 20) comprising a Ag/alumina material in combination with LNT materials. The Ag/Al$_2$O$_3$ material is used in combination with a lean NOx trap reactor (LNT). In this example, the Ag/Al$_2$O$_3$ material and LNT (block 20) are used upstream in exhaust flow from an under floor diesel particulate filter (DPF, block 24). A DOC (block 22) may also be employed just upstream of the DPF (block 24) to generate elevated temperatures for the removal of particulate material from the DPF. For example, raw fuel may be injected at the DOC (block 22) so that it burns the fuel with oxygen in the lean exhaust to heat the exhaust for regeneration of the DPF. Such heating is done well downstream of the silver/alumina material and the LNT.

But in this embodiment of the invention, the Ag/Al$_2$O$_3$ material is used in combination with the three materials of a LNT device-the DOC material, the NO$_2$ adsorber material, and the NOx reduction material. The Ag/Al$_2$O$_3$ material is used where hydrogen is present in the exhaust following the starting of a cold diesel engine. Again, wash coat of particles of a suitable Ag/Al$_2$O$_3$ material, containing about 0.5% to about 10% silver based on the total weight of the silver and alumina, is used. The NO$_2$ produced on the silver/alumina and the NOx stored on it are eventually released from the silver/alumina. The NOx is stored on the LNT and converted to nitrogen during fuel rich impulse cycles of the engine.

Thus, the LNT typically serves as a NOx adsorber, a converter of NOx to N$_2$, and a DOC. Much of the time during warmed-up engine operation the LNT is exposed to the hot lean exhaust of the engine and serves its adsorber and oxidation function in oxygen-containing exhaust. However, periodically engine operation is managed by an engine control computer to burn fuel-rich to produce reductants in the exhaust so that the LNT can convert stored NOx to nitrogen. In some exhaust systems, some NOx in the exhaust is converted by the LNT to ammonia rather than N$_2$. Optionally, an under floor urea-SCR catalyst may be located downstream of the LNT (not illustrated in FIG. 5) to convert the ammonia and any residual NOx to N$_2$.

Where two cordierite bricks are used, or where an upstream section and a downstream section of a single brick is used, the Ag/Al$_2$O$_3$ material is used upstream of the separate LNT materials. In this way, the Ag/Al$_2$O$_3$ material is first exposed to the relatively low temperature exhaust and serves to oxidize NO to NO$_2$ and to absorb NO$_2$ for later release to the LNT and other downstream exhaust stream treatment bodies. But as further disclosed with respect to FIG. 5, the Ag/Al$_2$O$_3$ material may be combined with LNT materials as a wash coating on a single cordierite brick as follows.

The LNT materials may be deposited as a first wash coat layer on the channel walls of the brick and, subsequently, a suitable Ag/Al$_2$O$_3$ material may be deposited as a second layer (as illustrated in FIG. 4), coextensively with the underlying layer of LNT materials. Alternatively, the Ag/Al$_2$O$_3$ material and the LNT materials may be mixed and deposited as a single layer on the walls of a single cordierite brick, as illustrated in FIG. 3.

Figure 6:
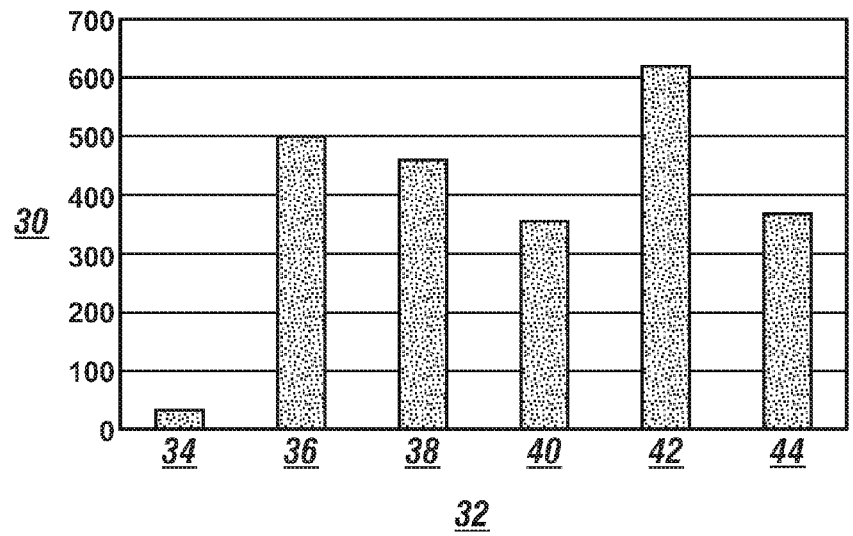
FIG. 6 is a bar graph presenting the cumulative amounts in milligrams of NO (vertical axis 30), that were stored from a synthetic diesel exhaust stream, each at 150° C., by (from left to right on the horizontal-axis, 32) a commercial PGM based LNT material (data bar 34), a combination of $Ag/Al_2O_3$ and the LNT material (data bar 36), and a combination of $Ag/Al_2O_3$ and MnCeOx (data bar 38). The following three bar data present the cumulative amounts in milligrams of NO that were stored, respectively by the same three materials at 200° C. (data bars 40, 42, and 44, respectively). The synthetic diesel exhaust stream consisted of 500 ppm $H_2$, 150 ppm NO, 1000 ppm Cl Hydrocarbons, 10% $CO_2$, 8% $O_2$, 8% $H_2O$, and nitrogen and engaged the storage materials at a space velocity of 50,000 $h^{-1}$.

The utility of using the Ag/Al$_2$O$_3$ material for managing NOx in a relatively cold diesel exhaust stream is illustrated in the data presented in FIG. 6. FIG. 6 is a bar graph presenting the cumulative amounts in milligrams of NO (vertical axis 30) that were stored, or converted to N$_2$, by (from left to right on the x-axis, 32) a commercial PGM based LNT material (34), a combination of Ag/Al$_2$O$_3$ and the LNT material (36), and a combination of Ag/Al$_2$O$_3$ and MnCeOx (38). The exhaust feed was as follows: 1000 ppm Cl HCs (2:1 unburned to partially oxidized HCs, unburned is 2:1 dodecane to m-xylene, and partially burned is 2:1 propylene to propane), 150 ppm NO, 500 ppm H$_2$, 8% O$_2$, 10% CO$_2$, 8% water, 1500 ppm CO, and nitrogen. In these three tests the temperature of the synthetic exhaust gas stream feed was 150° C.

These data illustrate that when a conventional LNT material (barium-based, with 145 g/ft$^3$ PGM) is used to oxidize NO and adsorb NOx in a synthetic exhaust stream at 150° C., only about 30 milligrams NO was stored. When Ag/Al$_2$O$_3$ material was combined with the LNT material, the storage of NO increased to nearly 500 milligrams of NO. And when the Ag/Al$_2$O$_3$ material is combined with a non-PGM-based NO adsorber, MnCeOx, the combination is nearly as effective as the combination of the Ag/Al$_2$O$_3$ material with the commercial PGM-based LNT material.

The fourth (40), fifth (42), and sixth (44) bar data present the cumulative amounts in milligrams of NO that were stored, or converted to N$_2$, respectively by the same three materials at 200° C. This temperature approaches the normal operating temperature range of a conventional LNT material. The same pattern of improved storage and release by the Ag/Al$_2$O$_3$ material is seen.

Figure 7:
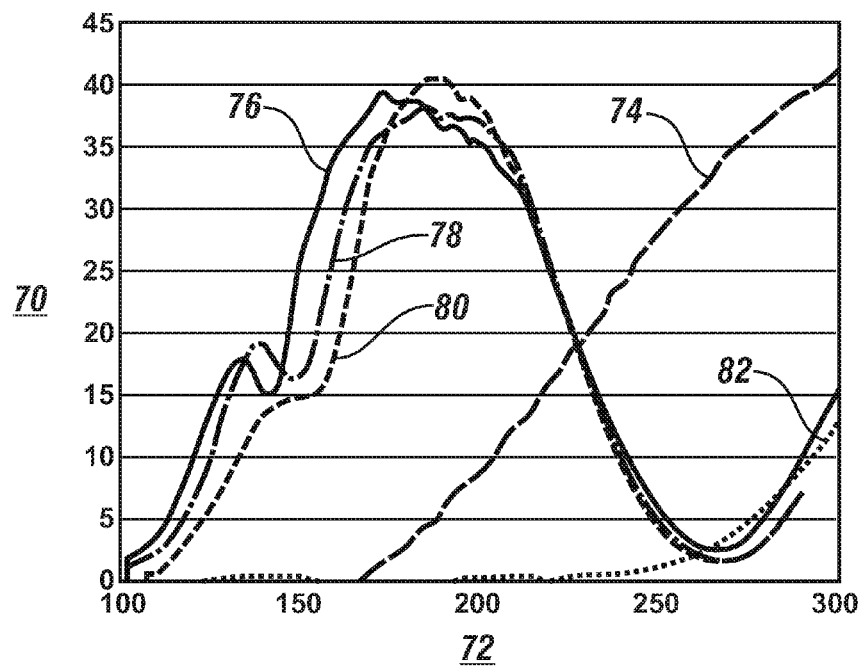
FIG. 7 is a graph of $NO_2$ (in ppm) (vertical axis, 70) absorbed by a commercial DOC material in a synthetic stream also containing 1500 ppm hydrogen (curve 74), and by four samples of 5% $Ag/Al_2O_3$ with 1500 ppm $H_2$ (curve 76), 750 ppm $H_2$ (curve 78), 300 ppm $H_2$ (curve 80), and 0 $H_2$ (curve 82), respectively, at gas stream inlet temperatures from 100° C. to 300° C. (horizontal axis, 72).

FIG. 7 is a graph of NO$_2$ (in ppm) (vertical axis, 70) produced by a commercial DOC in a synthetic stream (like that in the data of FIG. 6, at 50,000 h$^{-1}$ SV) also containing 1500 ppm hydrogen (curve 74), and by four samples of 5% Ag/Al$_2$O$_3$ with 1500 ppm H$_2$ (curve 76), 750 ppm H$_2$ (curve 78), 300 ppm H$_2$ (curve 80), and 0 H$_2$ (curve 82), respectively, at gas stream inlet temperatures from 100° C. to 300° C.

(horizontal axis, 72). It is seen that when hydrogen (in 300 to about 1500 ppm) is present in low temperature diesel exhaust, the $Ag/Al_2O_3$ material of this invention is very effective in oxidizing NO to $NO_2$. The $Ag/Al_2O_3$ material of this invention is likewise very effective in temporarily storing the $NO_2$ until downstream selective reduction catalysts are warmed to their operating temperatures.

Thus, a silver/alumina catalyst is very helpful in the oxidation of NO to $NO_2$, and the temporary storage of NOx in relatively low temperature diesel exhaust streams, where the exhaust contains relatively small amounts of hydrogen. Further, the $NO_2$ generated by the silver/alumina can be stored by both a PNA material or a LNT. This is important because neither conventional PNA material or LNT will oxidize NO below about 200° C. unless they contain very high amounts of platinum, which amounts are prohibitively expensive. The silver content of the silver/alumina catalyst is suitably in the range of about 0.5% to about 10%. The silver-based catalyst and NOx absorber provides a very effective complement to PNA materials generally and to the PNA compositions in LNT material combinations. Engine operation can readily be managed during such cold-start periods to provide hydrogen from the combustion of diesel fuel for such temporary oxidation and storage functions of the silver catalyst material.

The invention claimed is:

1. A method of treating the exhaust gas stream flowing from a vehicle internal combustion engine during a period following a cold-start of the engine, the exhaust gas stream comprising a mixture of nitric oxide, carbon monoxide, hydrocarbons, hydrogen, water, carbon dioxide, oxygen, and nitrogen, the exhaust gas stream being at an initial temperature below about 75° C. and progressively warming during continued engine operation, the method comprising;

continually passing the hydrogen-containing and nitric oxide-containing exhaust gas stream in contact with a silver/alumina material, the silver/alumina material consisting of particles of silver or a silver oxide supported on particles of alumina, the silver/alumina material being deposited on a substrate that accommodates the flow of the exhaust gas stream into contact with the silver/alumina material, the silver/alumina material oxidizing at least a portion of the nitric oxide to nitrogen dioxide in the presence of hydrogen and temporarily storing some of the nitrogen oxide and nitrogen dioxide product as the exhaust gas stream is progressively warmed from about 75° C. to about 190° C., the exhaust gas stream next flowing into contact with a different absorber material selected to serve as an NOx absorber during the period following the cold start of the engine; then, continually and subsequently passing the exhaust gas stream through at least one downstream reactor for further oxidation or reduction of constituents of the exhaust as the exhaust gas increases in temperature and heats each such downstream reactor to an oxidation or reduction operating temperature; and continuing the passage of the exhaust gas in contact with the silver/alumina material, the different absorber material, and through each reactor during the duration of engine operation, the silver/alumina material releasing its absorbed nitrogen oxides and ceasing to oxidize NO in the exhaust gas stream when it is warmed by the exhaust stream above its absorption temperature range for the nitrogen oxides; the silver/alumina material again commencing its NO oxidation function and nitrogen dioxide absorption following an engine cool-down period and a subsequent engine cold start.

2. A method of treating the exhaust from a vehicle internal combustion engine as recited in claim 1 in which the silver/alumina material consists of particles of silver or a silver oxide deposited on carrier particles of alumina and the silver content is in the weight range of about 0.5% to about 10% of the total weight of the particles of silver or silver oxide and alumina.

3. A method of treating the exhaust from a vehicle internal combustion engine as recited in claim 1 in which the hydrogen and nitric oxide-containing exhaust is passed in contact with the silver/alumina material and then into contact with a platinum group metal which is composed to absorb nitrogen dioxide during the cold start period and to commence oxidation of NO when it is heated by the flowing exhaust gas to a temperature of about 190° C. or higher.

4. A method of treating the exhaust from a vehicle internal combustion engine as recited in claim 3 in which the platinum group metal is a mixture of platinum particles and palladium particles deposited on supporting particles of ceria or particles of mixtures of ceria and alumina.

5. A method of treating the exhaust from a vehicle internal combustion engine as recited in claim 1 in which the hydrogen and nitric oxide-containing exhaust is passed in contact with the silver/alumina material and then in contact with a passive absorbent material which is composed to absorb nitrogen dioxide during the cold start period and to release the nitrogen dioxide when it has been heated by the flowing exhaust gas to a temperature of about 190° C. or higher.

6. A method of treating the exhaust from a vehicle internal combustion engine as recited in claim 5 in which the passive absorbent material comprises at least one of a cerium oxide and a manganese cerium oxide.

7. A method of treating the exhaust from a vehicle internal combustion engine as recited in claim 1 in which the silver/alumina material is located so that the exhaust gas stream exits an exhaust manifold of the engine in a defined exhaust gas flow path and flows into contact with the silver/alumina material after flowing no more than about fifty centimeters distance along the flow path after leaving the exhaust manifold.

8. A method of treating the exhaust from a vehicle internal combustion engine as recited in claim 1 in which the vehicle internal combustion engine is a diesel engine which is controlled to operate at an air-to-fuel ratio of about 17:1 during a major portion of its operation.

9. A method of treating the exhaust from a vehicle internal combustion engine as recited in claim 1 in which the silver/alumina material is deposited as wash coat layers on the wall surfaces of parallel open-ended channels in a first monolithic body, the parallel open-ended channels extending from an exhaust gas flow inlet to an exhaust gas flow outlet of the monolithic body and particles of the different NOx absorber material are deposited on wall surfaces of channels of a second monolithic body located downstream of the first monolithic body in the flow of the exhaust gas stream.

10. A method of treating the exhaust from a vehicle internal combustion engine as recited in claim 9 in which the silver/alumina particulate material is deposited as wash coat layers on the wall surfaces of parallel open-ended channels in an monolithic body at the gas flow inlet end of the body and particles of a different absorbent material for NOx are deposited as a wash coat on the wall surfaces of parallel open-ended channels at the gas flow outlet end of the body.

11. A method of treating the exhaust from a vehicle internal combustion engine as recited in claim 9 in which particles of the different absorber material are deposited as a wash coat on the wall surfaces of parallel open-ended channels, the wash coat of different absorber material for NOx extending on the wall surfaces from the exhaust gas flow inlet of the body to its exhaust gas flow outlet, and in which particles of the silver/alumina material are deposited as a wash coat overlying the wash coat particles of the different absorber material for NOx.

12. A method of treating the exhaust from a vehicle internal combustion engine as recited in claim 1 in which the hydrogen content of the exhaust gas stream is in the range of about 100 ppm to about 1000 ppm during a period following the cold start of the engine.

13. A method of treating the exhaust from a vehicle internal combustion engine as recited in claim 1 in which the exhaust gas stream flows into contact in sequence with the silver/alumina material, a passive NOx absorber material, and with a selective reductant for the NOx.

14. A method of treating the exhaust from a vehicle internal combustion engine as recited in claim 1 in which the exhaust gas flows into contact with the silver/alumina material and then with the constituents of a lean NOx trap; the constituents of the lean NOx trap comprising an oxidation catalyst for the oxidation of NO to $NO_2$, an adsorbent material for adsorbing NOx, and a reduction catalyst for the reduction of NO and $NO_2$ to nitrogen.

15. A method of treating the exhaust from a vehicle internal combustion engine as recited in claim 14 in which the oxidation catalyst comprises platinum particles supported on alumina particles, the adsorbent material comprises an oxide of one or more metals selected from the group consisting of barium, calcium, cerium, cesium, lanthanum, lithium, magnesium, manganese, potassium, sodium, strontium, or yttrium, and the reduction catalyst comprises palladium or rhodium.

16. A method of treating the exhaust gas stream flowing from the exhaust manifold of a vehicle internal combustion engine during a period following a cold-start of the engine, the exhaust gas stream during the period of the cold start comprising a mixture of nitric oxide, carbon monoxide, hydrocarbons, hydrogen, water, carbon dioxide, oxygen, and nitrogen, the exhaust gas stream being at an initial temperature below about 75° C. and progressively warming during continued engine operation, the method comprising;

continually passing the hydrogen-containing and nitric oxide-containing exhaust gas stream, following its exit from the exhaust manifold, into first contact with a silver/alumina material that is located in the exhaust gas stream flow, the silver/alumina material consisting of particles of silver or a silver oxide supported on particles of alumina, the silver/alumina material being deposited on a substrate that accommodates the flow of the exhaust gas stream into contact with the silver/alumina material, the silver/alumina material oxidizing at least a portion of the nitric oxide to nitrogen dioxide in the presence of hydrogen and temporarily storing some of the nitrogen oxide and nitrogen dioxide product on the silver/alumina material as the temperature of the exhaust gas stream is progressively warmed from about 75° C. to about 190° C., the exhaust gas stream next flowing into contact with a different absorber material selected to serve as an NOx absorber during the period following the cold start of the engine then, continually and subsequently passing the exhaust gas stream through at least one downstream reactor for further oxidation or reduction of constituents of the exhaust as the exhaust gas increases in temperature and heats each such downstream reactor to an oxidation or reduction operating temperature; and continuing the passage of the exhaust gas in contact with the silver/alumina material and through each reactor during the duration of engine operation, the silver/alumina material releasing its absorbed nitrogen oxides and ceasing to oxidize NO in the exhaust gas stream when it is warmed by the exhaust stream above its absorption temperature range for the nitrogen oxides; the silver/alumina material again commencing its NO oxidation function and nitrogen dioxide absorption following an engine cool-down period and a subsequent engine cold start.

17. A method of treating the exhaust from a vehicle internal combustion engine as recited in claim 16 in which the silver/alumina material is located so that the exhaust gas stream exits an exhaust manifold of the engine in a defined exhaust gas flow path and flows into contact with the silver/alumina material after flowing no more than about fifty centimeters distance along the flow path after leaving the exhaust manifold.

18. A method of treating the exhaust from a vehicle internal combustion engine as recited in claim 16 in which the silver/alumina material consists of particles of silver or a silver oxide deposited on carrier particles of alumina and the silver content is in the weight range of about 0.5% to about 10% of the total weight of the particles of silver or silver oxide and alumina.

19. A method of treating the exhaust from a vehicle internal combustion engine as recited in claim 18 in which the vehicle internal combustion engine is a diesel engine which is controlled to operate at an air-to-fuel ratio of about 17:1 during a major portion of its operation.

20. A method of treating the exhaust from a vehicle internal combustion engine as recited in claim 16 in which the silver/alumina material is deposited as wash coat layers on the wall surfaces of parallel open-ended channels in a first monolithic body, the parallel open-ended channels extending from an exhaust gas flow inlet to an exhaust gas flow outlet of the monolithic body and particles of the different NOx absorber material are deposited on wall surfaces of channels of a second monolithic body located downstream of the first monolithic body in the flow of the exhaust gas stream.

* * * * *